(12) United States Patent
Mallik et al.

(10) Patent No.: US 7,913,071 B2
(45) Date of Patent: Mar. 22, 2011

(54) SYSTEMS AND METHODS FOR PROCESS AND USER DRIVEN DYNAMIC VOLTAGE AND FREQUENCY SCALING

(75) Inventors: Arindam Mallik, Evanston, IL (US); Bin Lin, Hillsboro, OR (US); Gokhan Memik, Evanston, IL (US); Peter Dinda, Evanston, IL (US); Robert Dick, Evanston, IL (US)

(73) Assignee: Northwestern University, Evanston, IL (US)

( * ) Notice: Subject to any disclaimer, the term of this patent is extended or adjusted under 35 U.S.C. 154(b) by 814 days.

(21) Appl. No.: 11/831,575

(22) Filed: Jul. 31, 2007

(65) Prior Publication Data

US 2009/0037712 A1      Feb. 5, 2009

(51) Int. Cl.
  *G06F 9/00* (2006.01)
  *G06F 1/00* (2006.01)
  *H04B 1/04* (2006.01)
  *H04M 1/00* (2006.01)

(52) U.S. Cl. ............ 713/1; 713/100; 713/300; 713/320; 455/127.5; 455/574

(58) Field of Classification Search .............. 713/1, 100, 713/300, 320; 455/127.5, 574
See application file for complete search history.

(56) References Cited

U.S. PATENT DOCUMENTS

| | | | |
|---|---|---|---|
| 6,714,890 B2 * | 3/2004 | Dai ............................... | 702/132 |
| 7,112,978 B1 * | 9/2006 | Koniaris et al. ............... | 324/763 |
| 7,119,523 B2 * | 10/2006 | Nakai ........................... | 323/268 |
| 7,467,318 B2 * | 12/2008 | Bruno et al. .................. | 713/500 |
| 7,577,859 B2 * | 8/2009 | Bilak ............................ | 713/320 |
| 7,603,575 B2 * | 10/2009 | Woodbridge et al. ......... | 713/322 |
| 2004/0025069 A1 | 2/2004 | Gary et al. | |
| 2005/0097228 A1 | 5/2005 | Flautner et al. | |
| 2005/0132238 A1 | 6/2005 | Nanja | |
| 2006/0123252 A1 * | 6/2006 | Vaidya et al. ................. | 713/300 |
| 2008/0141047 A1 * | 6/2008 | Riviere-Cazaux ............. | 713/300 |

OTHER PUBLICATIONS

Anand, M., Nightingale, E., and Flinn, J. Self-tuning Wireless Network Power Management. In The Ninth Annual International Conference on Mobile Computing and Networking (MobiCom'03) (2003).

Borkar, S., Karnik, T., Narendra, S., Tschanz, J., Keshavarzi, A., and De, V. Parameter Variations and Impact on Circuits and Microarchitecture. In Proceedings of the ACM/IEEE Design Automation Conference (DAC) (2003).

Brakmo, L. S., O'Malley, S. W., and Peterson, L. L. TCP Vegas: New Techniques for Congestion Detection and Avoidance. In Proceedings of the Conference on Communications Architectures, Protocols and Applications (1994), pp. 24-35.

Brock, B., and Rajamani, K. Dynamic Power Management for Embedded Systems. In Proceedings of the IEEE SOC Conference (2003).

(Continued)

*Primary Examiner* — Stefan Stoynov
(74) *Attorney, Agent, or Firm* — McAndrews, Held & Malloy, Ltd.

(57) ABSTRACT

Certain embodiments of the present invention provide a method for power management including determining at least one of an operating frequency and an operating voltage for a processor and configuring the processor based on the determined at least one of the operating frequency and the operating voltage. The operating frequency is determined based at least in part on direct user input. The operating voltage is determined based at least in part on an individual profile for processor.

19 Claims, 5 Drawing Sheets

OTHER PUBLICATIONS

Brooks, D., and Martonosi, M. Adaptive Thermal Management for High-Performance Microprocessors. In Workshop on Complexity Effective Design (2000).

Choi, K., Soma, R., and Pedram, M. Dynamic Voltage and Frequency Scaling based on Workload Decomposition. In Proceedings of the 2004 International Symposium on Low Power Electronics and Design (ISLPED '04) (2004), ACM Press, pp. 174-179.

Cohen, A., Finkelstein, F., Mendelson, A., Ronen, R., and Rudoy, D. On Estimating Optimal Performance of CPU Dynamic Thermal Management. IEEE Computer Architecture Letters 2,1 (2003), 6.

Dhar, S., Maksimovic, D., and Kranzen, B. ClosedLoop Adaptive Voltage Scaling Controller For Standard Cell ASICs. In Proceedings of The International Symposium on Low Power Electronics and Design (ISLPED) (2005), pp. 251-254.

Ernst, D., Kim, N. S., Das, S., Pant, S., Pham, T., Rao, R., Ziesler, C., Blaauw, D., Austin, T., and Mudge, T. Razor: A Low-Power Pipeline Based on Circuit-Level Timing Speculation. In ACM/IEEE International Symposium on Microarchitecture (MICRO) (2003).

Fall, K., and Floyd, S. Simulation-based comparisons of Tahoe, Reno and SACK TCP. SIGCOMM Computer Communication Review 26,3 (1996), 5-21.

Fei, Y., Zhong, L., and Jha, N. K. An Energy-aware Framework for Coordinated Dynamic Software Management in Mobile Computers. In IEEE/ACM Int. Symp. on Modeling, Analysis and Simulation of Computer and Telecommunication Systems (2004).

Flautner, K., and Mudge, T. Vertigo: Automatic Performance-Setting for Linux. In Proceedings of the 5th Symposium on Operating Systems Design and Implementation (OSDI) (Dec. 2002).

Fleischmann, M., Crusoe LongRun™ Power Management, Dynamic Power for Crusoe™ Processors, Transmeta Corporation, (Jan. 2001).

Gochman, S., and Ronen, R. The Intel Pentium M Processor: Microarchitecture and Performance. In Intel Technology Journal (2003).

Gupta, A., Lin, B., and Dinda, P. A. Measuring and Understanding User Comfort with Resource Borrowing. In Proceedings of the 13th IEEE International Symposium on High Performance Distributed Computing (HPDC 2004) (Jun. 2004).

Gurun, S., and Krintz, C. AutoDVS: an Automatic, General-purpose, Dynamic Clock Scheduling System for Handheld Devices. In EMSOFT '05: Proceedings of the 5th ACM international conference on Embedded software (2005), pp. 218-226.

Intel Corporation. Intel Pentium M Datasheet. http://developer.intel.com/design/mobile/pentium-m/documentation.htm.

Intel Corporation. Intel Pentium M Processor Thermal Management. http://www.intel.com/support/processors/mobile/pm/sb/CS-007971.htm.

Jaider, M. Notebook Hardware Control Personal Edition. http://www.pbus-167.com/chc.htm/.

Lin, B., and Dinda, P. Putting the User in Direct Control of CPU Scheduling. Tech. Rep. NWU-EECS-06-07, Department of Electrical Engineering and Computer Science, Northwestern University, Aug. 2006.

Lin, B., Mallik, A., Dinda, P. A., Memik, G., and Dick, R. P. Power Reduction Through Measurement and Modeling of Users and CPUs: Summary. Department of Electrical Engineering and Computer Science, Northwestern University, SIGMETRICS'07 (Jun. 2007).

Liu, D., and Svensson, C. Trading Speed for Low Power by Choice of Supply and Threshold Voltages. In IEEE J. Solid-State Circuits (1993), vol. 28, pp. 10-17.

Lorch, J., and Smith, A. Using User Interface Event Information in Dynamic Voltage Scaling Algorithms. In Technical Report UCB/CSD-02-1190, Computer Science Division, EECS, University of California at Berkeley, Aug. 2002.

Mallik, A., Lin, B., Dinda, P., Memik, G., and Dick, R. Process and User Driven Dynamic Voltage and Frequency Scaling. Tech. Rep. NWU-EECS-06-11, Department of Electrical Engineering and Computer Science, Northwestern University, Aug. 2006.

Mallik, A., Lin, B., Memik, G., Dinda, P., and Dick, R. User-Driven Frequency Scaling. Department of Electrical Engineering and Computer Science, Northwestern University, Aug. 2006.

Microsoft Corporation. Performance Logs and Alerts overview. http://www.microsoft.com/windows/windows2000/en/advanced/help/sag_mpmonperf_02a.htm.

Ranganathan, P., Geelhoed, E., Manahan, M., and Nicholas, K. Energy-Aware User Interfaces and Energy-Adaptive Displays. Computer 39, 3 (2006), 31-38.

Rohou, E., and Smith, M. Dynamically Managing Processor Temperature and Power. In 2nd Workshop on Feedback Directed Optimization (Nov. 1999).

Skadron, K., Stan, M. R., Sankaranarayanan, K., Huang, W., Velusamy, S., and Tarjan, D. Temperatureaware Microarchitecture: Modeling and Implementation. ACM Trans. Archit. Code Optim. 1, 1 (2004), 94-125.

Srinivasan, J., Adve, S. V., Bose, P., and Rivers, J. A. The Case for Lifetime Reliability-Aware Microprocessors. In the International Symposium on Computer Architecture (ISCA) (2004).

Stevens, W. TCP Slow Start, Congestion Avoidance, Fast Retransmit and Fast Recovery Algorithms. In Internet RFC 2001 (1997).

Theocharous, G., Mannor, S., Shah, N., Gandhi, P., Kveton, B., Siddiqi, S., Yu, C-H., Machine Learning for Adaptive Power Management, Intel Technology Journal 10, 04 (Nov. 2006).

Transmeta Corporation. The Technology Behind the Crusoe Processor, (2000).

Waizman, A., and Chung, C. Resonant free Power Network Design using Extended Adaptive Voltage Positioning (EAVP) Methodology. IEEE Transactions on Advanced Packaging 24, 3 (Aug. 2001), 236-244.

Wang, Z., and Crowcroft, J. Eliminating Periodic Packet Losses in the 4.3-Tahoe BSD TCP Congestion Control Algorithm. In ACM Computer Communications Review (1992).

Wei, J., Foxton Technology Pushes Processor Frequency, Application Performance. http://www.intel.com/technology/magazine/computing/foxton-technology-0905.htm.

Wolfram Podien. CPUCool. http://www.cpufsb.de/CPUCOOL.HTM.

Wu, Q., Reddi, V., Wu, Y., Lee, J., Connors, D., Brooks, D., Martonosi, M., and Clark, D. W. Dynamic Compilation Framework for Controlling Microprocessor Energy and Performance. In 38th International Symposium on Microarchitecture (MICRO-38) (2005).

Xu, R., Moss, D., and Melhem, R. Minimizing Expected Energy in Real-time Embedded Systems. In Proceedings of the 5th ACM international conference on Embedded software (EMSOFT) (2005), pp. 251-254.

Yan, L., Zhong, L., and Jha, N. K. User-perceived Latency based Dynamic Voltage Scaling for Interactive Applications. In Proceedings of ACM/IEEE Design Automation Conference (DAC '05) (2005).

* cited by examiner

| Operating Freq. (MHz) | Nominal Voltage (v) | Stable $V_{dd}$ (V) at temp ranges (°C) | | | | |
|---|---|---|---|---|---|---|
| | | 52-57 | 62-67 | 72-77 | 82-87 | |
| 800 | 0.988 | 0.736 | 0.736 | 0.736 | 0.736 | |
| 1,060 | 1.068 | 0.780 | 0.780 | 0.780 | 0.780 | |
| 1,200 | 1.100 | 0.796 | 0.796 | 0.796 | 0.796 | |
| 1,330 | 1.132 | 0.844 | 0.844 | 0.860 | 0.876 | |
| 1,460 | 1.180 | 0.876 | 0.892 | 0.908 | 0.924 | |
| 1,600 | 1.260 | 0.908 | 0.924 | 0.924 | 0.924 | |
| 1,860 | 1.324 | 1.004 | 1.004 | 1.020 | 1.020 | |
| 2,130 | 1.404 | 1.084 | 1.100 | 1.116 | 1.116 | |

Figure 4

SYSTEMS AND METHODS FOR PROCESS AND USER DRIVEN DYNAMIC VOLTAGE AND FREQUENCY SCALING

FEDERALLY SPONSORED RESEARCH OR DEVELOPMENT

This invention was made with government support under Grant Nos. ANI-0093221, CCF-0541337 and CNS-0347941 awarded by the National Science Foundation and under Grant No. DE-FG02-05ER25691 awarded by the Department of Energy. The government has certain rights in the invention.

RELATED APPLICATIONS

[Not Applicable]

MICROFICHE/COPYRIGHT REFERENCE

[Not Applicable]

BACKGROUND OF THE INVENTION

The present invention generally relates to power management of a processor. More specifically, the present invention relates to systems and methods for process and user driven dynamic voltage and frequency scaling.

Current systems utilize numerous power-reduction techniques in circuits, architectures, and operating systems (OS). Energy consumption has traditionally been one of the primary design criteria for mobile systems, for example, because of the effect of energy consumption on battery life. In line-powered systems, on the other hand, energy consumption is important due to its impact on power dissipation, which affects cost and noise. As more transistors are packed into a given area, the power density increases, and as a result, the chip temperature during execution is elevated, affecting performance, reliability, and integrated circuit (IC) lifetime.

Dynamic Voltage and Frequency Scaling (DVFS) is a typical power reduction technique in high-performance processors. DVFS varies the frequency and voltage of a processor in real-time according to processing needs. Although there are different versions of DVFS, at its core DVFS adapts power consumption and performance to the current workload of the CPU. Specifically, existing DVFS techniques in high-performance processors select an operating point (CPU frequency and voltage) based on the utilization of the processor.

While the approach of selecting an operating point based on utilization integrates OS-level control, such control is pessimistic. That is, existing DVFS techniques are pessimistic about both the CPU and the user.

With respect to the CPU, current DVFS techniques assume worst-case manufacturing process variation and operating temperature by basing their policies on loose, worst-case bounds given by the processor manufacturer. For example, a voltage level for a given frequency is set such that all manufactured processors in that generation are guaranteed to work under worst-case assumptions, such as highest temperature and process variation.

With respect to the user, current DVFS techniques ignore the user, and instead assume that CPU utilization is a sufficient proxy. For example, a high CPU utilization simply leads to a high frequency and high voltage, regardless of the user's satisfaction or expectation of performance. Some DVFS algorithms use task information, such as measured response times in interactive applications as a proxy for the user.

BRIEF SUMMARY OF THE INVENTION

Certain embodiments of the present invention provide a method for power management including determining at least one of an operating frequency and an operating voltage for a processor and configuring the processor based on the determined at least one of the operating frequency and the operating voltage. The operating frequency is determined based at least in part on direct user input. The operating voltage is determined based at least in part on an individual profile for processor.

Certain embodiments of the present invention provide a processor power management system including a power management component adapted to determine at least one of an operating frequency and an operating voltage for a processor and a processor control component adapted to configure the processor based on the determined at least one of the operating frequency and the operating voltage. The operating frequency is determined based at least in part on direct user input. The operating voltage is determined based at least in part on an individual profile for processor.

Certain embodiments of the present invention provide a computer-readable medium including a set of instructions for execution on a computer, the set of instructions including a power management routine configured to determine at least one of an operating frequency and an operating voltage for a processor and a processor control routine configured to configure the processor based on the determined at least one of the operating frequency and the operating voltage. The operating frequency is determined based at least in part on direct user input. The operating voltage is determined based at least in part on an individual profile for processor.

BRIEF DESCRIPTION OF SEVERAL VIEWS OF THE DRAWINGS

FIG. 4 illustrates a table showing an exemplary individual profile for a processor according to an embodiment of the present invention.

Figure 1:
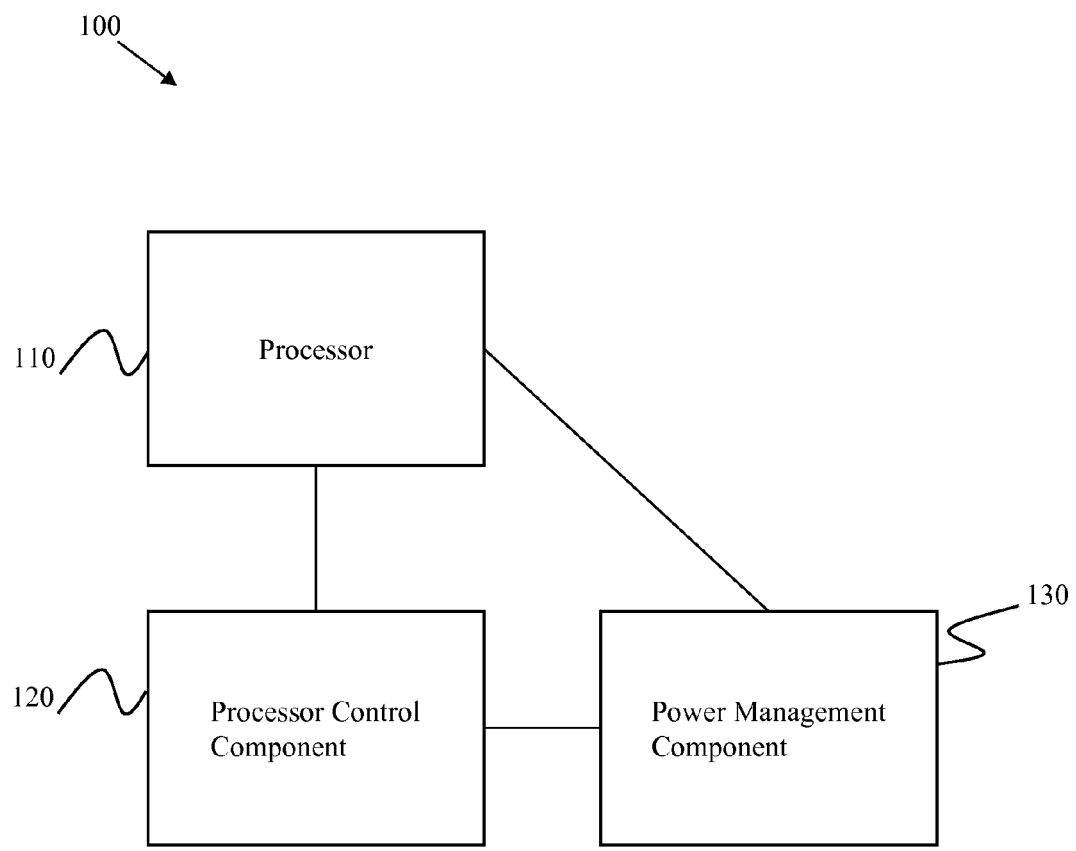
FIG. 1 illustrates a system for power management of a processor according to an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Information regarding certain embodiments of the present invention is discussed in Mallik et al., "Process and User Driven Dynamic Voltage and Frequency Scaling," Technical Report NWU-EECS-06-11, Aug. 14, 2006, which is herein incorporated by reference in its entirety.

FIG. 1 illustrates a system 100 for power management of a processor 110 according to an embodiment of the present invention. The system 100 includes a processor control component 120 and a power management component 130.

The processor control component 120 is in communication with the processor 110. The power management component 130 is in communication with the processor control component 120. In certain embodiments, the power management component 130 is in communication with the processor 110.

In operation, the power management component 130 determines an operating frequency and/or an operating voltage for the processor 110. The power management component 130 communicates the operating frequency and/or operating voltage to the processor control component 120. The processor control component 120 then configures the processor 110 to operate using the operating frequency and/or operating voltage.

The processor 110 may include a central processing unit (CPU), graphics processor, microprocessor, microcontroller, application-specific integrated circuit (ASIC), field programmable gate array (FPGA), digital signal processor (DSP), disk controller, memory controller, or memory, for example. The processor 110 may include multiple cores. In certain embodiments, the system 100 is adapted to individually control more than one processor 110.

The power management component 130 is adapted to determine at least one of an operating frequency and an operating voltage for the processor 110. That is, the power management component 130 uses DVFS techniques to determine the operating frequency and/or operating voltage. In certain embodiments, traditional DVFS techniques are used to determine the operating frequency. In certain embodiments, traditional DVFS techniques are used to determine the operating voltage.

In certain embodiments, the operating frequency is determined by the power management component 130 using User-Driven Frequency Scaling (UDFS). As will be explained in more detail below, UDFS uses direct user feedback to drive an online control algorithm that determines the processor frequency. That is, UDFS automatically adapts the operating frequency of a processor based on express user preference being provided at runtime. The reduction in operating frequency allows for a reduction in power consumption. Thus, to the extent a user willing to provide input, power consumption may be reduced.

Processor frequency has strong effects on power consumption and temperature, both directly and also indirectly through the need for higher voltages at higher frequencies. Unlike voltage, however, the choice of frequency is directly visible to the end-user as it determines the performance of a processor, such as processor 110. There is considerable variation among users with respect to the satisfactory performance level for a given workload mix. UDFS exploits this variation to customize frequency control policies dynamically to the individual user. UDFS employs direct feedback from the user during ordinary use of the machine.

Current software that drives DVFS is pessimistic about the individual user's reaction to the slowdown that may occur when processor operating frequency is reduced. Typically, in traditional DVFS techniques, the frequency is tightly tied to processor utilization. A burst of computation due to, for example, a mouse or keyboard event brings utilization quickly up to 100% and drives frequency, voltage, and power consumption up along with it. Processor-intensive applications also immediately cause an almost instant increase in operating frequency and/or voltage.

User comfort with any given DVFS strategy is highly dependent on the application. Comfort with a given strategy is also strongly user-dependent. That is, for any particular strategy, there is considerable spread in user comfort levels.

It is important to note that a strategy that simply selects a static frequency for an application (and/or for a user) is inadequate for three reasons. First, each user will be satisfied with a different level of performance for each application. Finding these levels statically would be extremely time consuming. Second, typical users multitask. Capturing the effects of multiple applications would necessitate examining the power set of the application set for each individual user, resulting in a combinatoric explosion in the offline work to be done. Finally, even when a user is working with a single application, the behavior of the application and the expected performance varies over time. Applications go through phases, each with potentially different computational requirements. Phases may be both within the application and between applications. For example, a user using a word processor may put the application through phases including typing, spellchecking, and printing, each having different expected performance. As another example, a user may cause applications to go through different usage phases. That is, a user may use a web browser while listening to music and then transition to using the word processor. In addition, the user's expected performance is also likely to change over time as the user's priorities shift.

UDFS automatically adapts to different users and applications. That is, UDFS is user-specific, and can thus behave differently for different users. In certain embodiments, a history of events is stored for each user. In addition, UDFS does not require prior information about the particular application or the various phases an application may go through. Hence, UDFS can reduce power consumption while still achieving high user satisfaction.

In certain embodiments, a user may express discomfort with current performance to the UDFS algorithm. That is, a user may provide direct feedback on the current user experience to the UDFS algorithm. This may be done by pressing a key, such as the F11 key, for example. Other keys or controls may also be configured. As another example, a user may press a dedicated button, separate from the standard keys or other inputs. As another example, a user may provide direct feedback on the user's lack of satisfaction by providing "unusual" input, such as wiggling a mouse in a certain way that would not ordinarily occur in using the system. As another example, a computing system, such as a laptop, may include a motion sensor, and a user may express discomfort with current performance by tapping, hitting, or jarring the system to active the sensor. As another example, a computing system may include a microphone or other aural input device to detect user discomfort. A speech recognition program looking for a particular word or sound may be utilized, for example. These "user events" drive the UDFS algorithm, rather than a proxy such as processor utilization or measured response times in an application. Proxies used by current systems include message delay and latency and network delay and latency, for example. For example, the delay between the generation of a Windows Message and the delivery of the message may be used as a proxy. As another example, network round trip time may be used as a proxy.

In certain embodiments, an indication of power usage in relation to processor usage may be provided to a user by the power management component 130. This indication may allow a user to consciously make a trade-off to slow down the operating frequency to decrease power usage. As a result, the user may be given an indication of increased battery time resulting from the reduced power usage.

Two exemplary frequency control algorithms for UDFS, UDFS1 and UDFS2, are described below.

UDFS1 Algorithm

UDFS1 is an adaptive algorithm that may be viewed as an extension or variant of the TCP congestion control algorithm. The TCP congestion control algorithm is designed to adapt the send rate dynamically to the available bandwidth in the path. A congestion event corresponds to a user event in the UDFS1 algorithm, send rate corresponds (inversely) to processor operating frequency in the UDFS1 algorithm, and TCP acknowledgments correspond to the passage of time.

UDFS1 has two state variables: r, the current control value (operating frequency; the smaller the value, the higher the frequency) and $r_t$ (the current threshold). Adaptation is controlled by three parameters: $\rho$, the rate of increase; $\alpha$, the slow start speed; and $\beta$, the additive increase speed. $\alpha$ and $\beta$ may be constant, for example. Like TCP, UDFS1 operates in three modes, as described below.

First Mode: Slow Start (Exponential Increase): If $r<r_t$, r is increased exponentially fast with time (e.g., $r \propto 2^{\alpha t}$). Note that frequency settings for most processors are quantized and thus the actual frequency may change abruptly upon crossing quantization levels.

Second Mode: User Event Avoidance (Additive Increase): If no user feedback is received and $r \geq r_t$, r increases linearly with time, $r \propto \beta t$.

Third Mode: User Event (Multiplicative Decrease): When the user expresses discomfort at level r, $r_t$ is set to $r_t - 1$ and r is set to the initial (highest) frequency.

This behavior is similar to that of TCP Reno, although UDFS1 includes more aggressive setting of the threshold. The TCP Reno algorithm takes the threshold and cuts it by half. That is, a multiplicative decrease. UDFS1, on the other hand, is more aggressive because it reduces the threshold by 1, an additive decrease.

Unlike TCP Reno, however, UDFS also controls $\rho$, the key parameter that controls the rate of exponential and linear increase from button press to button press. In particular, for every user event, $\rho$ is updated as follows:

$$\rho_{i+1} = \rho_i \left(1 + \gamma \times \frac{T_i - T_{AVI}}{T_{AVI}}\right)$$

where: $T_i$ is the latest inter-arrival time between user events; $T_{AVI}$ is the target mean inter-arrival time between user events; and $\gamma$ controls the sensitivity to the feedback. If $\gamma$ is made smaller, more user events are needed to get to a particular level. That is, there is finer time granularity. If $\gamma$ is made larger, fewer user events are needed to get to a particular level, but the time granularity is larger. $T_{AVI}$ is preset. In certain embodiments, $T_{AVI}$ may be determined dynamically. In certain embodiments, $T_{AVI}$ may be set on a per-user basis.

For example, the constant parameters may be preset as follows: $T_{AVI}=120$, $\alpha=1.5$, $\beta=0.8$, $\gamma=1.5$.

The following pseudocode describes the modes discussed above according to certain embodiments:

```
          INITIALIZATION:
//control value for different frequency levels
//r is mapped through this table to set actual frequency
// table is in decreasing order of frequency
// position 0 is not used
// increasing r => lower frequency
//These are numbers for a Pentium M, which has 7 frequency levels
```

-continued

```
// THRT_LEV[floor(r)] is used to program the processor
THRT_LEV[7] = {0, 100, 90, 80, 70, 60, 45};
//Initial frequency is maximum
//the determine the frequency, the bigger the r, the lower the frequency
r = 1;
// Number of levels
r_max=7;
//Initial update rate
rho = 1;
// Start in slow start mode
state=slow_start;
// Target interaction interval
T_AVI = some period;
         STEADY_STATE:
// every rho seconds we execute:
switch (state) {
  case slow_start:
    //increase exponentially, until we hit the threshold
    if ((alpha * 2 * r) < r_t) { // threshold is r_t as in the paper
      r = alpha * 2 * r;
      //default rate is exp(2), alpha is default 1 in here
      //it controls the exponential (base is 2) increase speed
    } else if ((alpha* 2 * r) >=r_t) {
      r = r_t;
      state = irritation_avoid;
    }
    break;
  case irritation_avoid:
    //this is the addictive increase
    if ((r + beta) < r_max) {
      // default rate is linear(1)
      // beta is default 1 in here, it controls the addictive increase speed
      r = r + beta;
    } else if ((r + beta) >= r_max) {
      r = r_max;
    }
    break;
} //end of switch
SetFrequency(THRT_LEV[floor(r)])
         USER_EVENT:
//When the user hits the irritation button, we do the following
if(r_t > 1) {
  r_t = (int) r - 1;
  //this reduces the threshold
}
// return to highest frequency
r = 1;
// update rho
// Let T be the duration since the last button press
rho_tmp = rho * (1 - gamma * ( T - T_avi) / T_avi);
rho = MAX(rho_tmp,0)
state = slow_start;
irritated = false;
SetFrequency(THRT_LEV[floor(r)])
```

Figure 2:
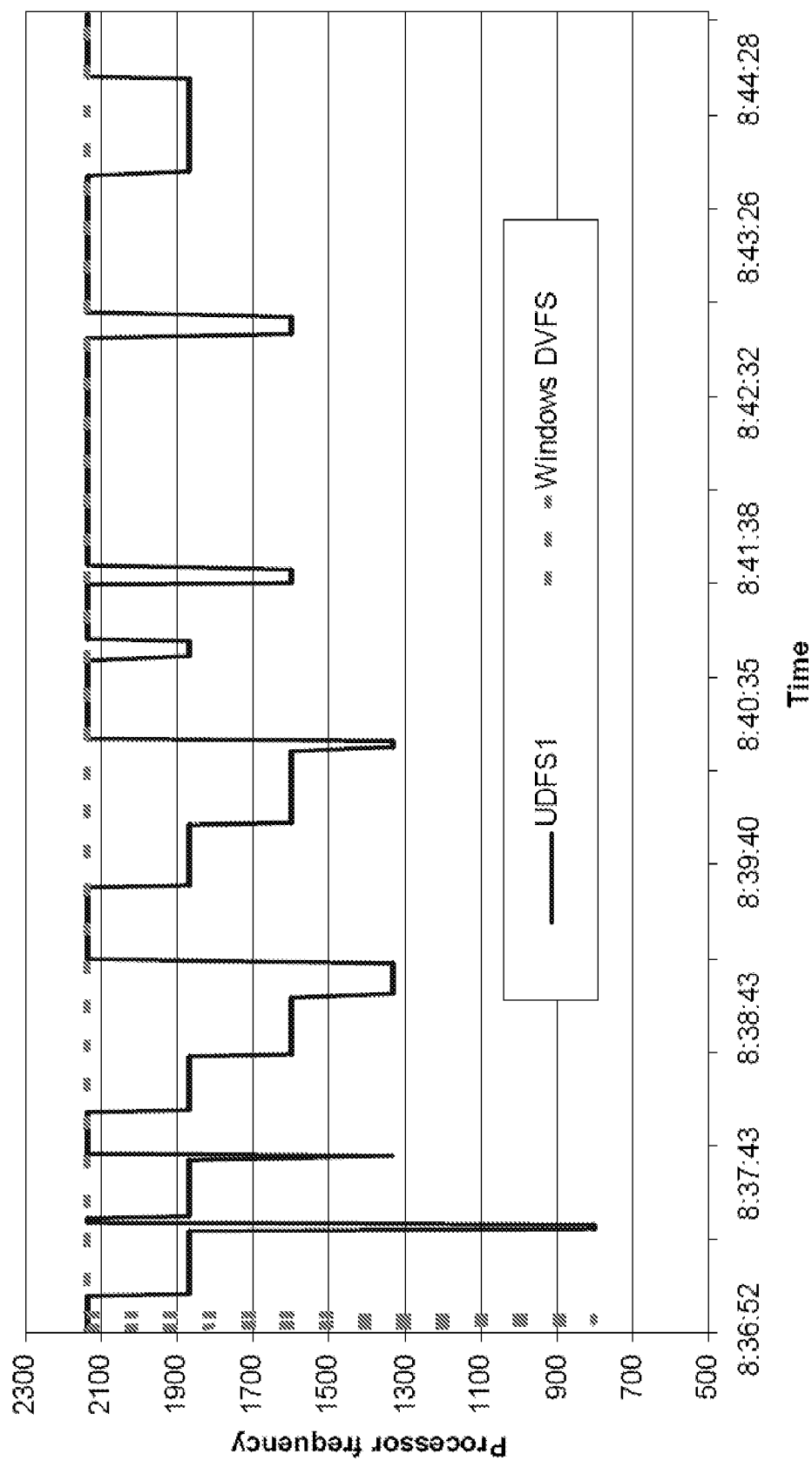
FIG. 2 illustrates a graph comparing the operating frequencies determined by UDFS1 and Windows DVFS according to an embodiment of the present invention.

FIG. 2 illustrates a graph comparing the operating frequencies determined by UDFS1 and Windows DVFS according to an embodiment of the present invention. More particularly, FIG. 2 illustrates the operating frequencies determined by the two techniques while a user is playing a game. Note that Windows DVFS causes the system to run at the highest operating frequency during the whole execution period except the first few seconds. On the other hand, the UDFS1 scheme causes the processor's operating frequency to increase only when the user expresses discomfort (e.g., by pressing the F11 key). Otherwise, the operating frequency slowly decreases. Based on experiments, this may result in a 15-20% savings versus current DVFS techniques.

UDFS2 Algorithm

In general, the UDFS2 algorithm tries to find the lowest frequency at which the user feels comfortable and then stabilize there. UDFS2 determines a set of levels, $r_1$ to $r_n$, corresponding to available operating frequencies for a processor such as processor 110. For each frequency level, an interval, $t_i$, the time for the algorithm to stay at that level, is assigned.

If no user feedback is received during the interval, the algorithm reduces the frequency from $r_i$ to $r_{i+1}$. That is, UDFS2 reduces the frequency by one level. In certain embodiments, the frequency may be reduced by more than one level.

The default interval is 10 seconds for all levels. In certain embodiments, different levels may have different default intervals. For example, a level corresponding to a higher frequency may have a shorter interval than a level corresponding to a lower frequency.

When a user provides feedback, a user event, while operating at level $r_i$, UDFS2 updates the intervals and the current operating frequency level as follows:

$$t_{i-1} = \alpha t_{i-1}$$

$$t_k = \beta t_k, \forall k: k \neq i-1$$

$$i = \min(i-1, 0)$$

Here, $\alpha > 1$ is the rate of interval increase and $\beta < 1$ is the rate of interval decrease. For example, a may be 2.5 and β may be 0.8. UDFS2 adapts based on the conjecture that the user was comfortable with the previous level and the algorithm should spend more time at that level.

Figure 3:
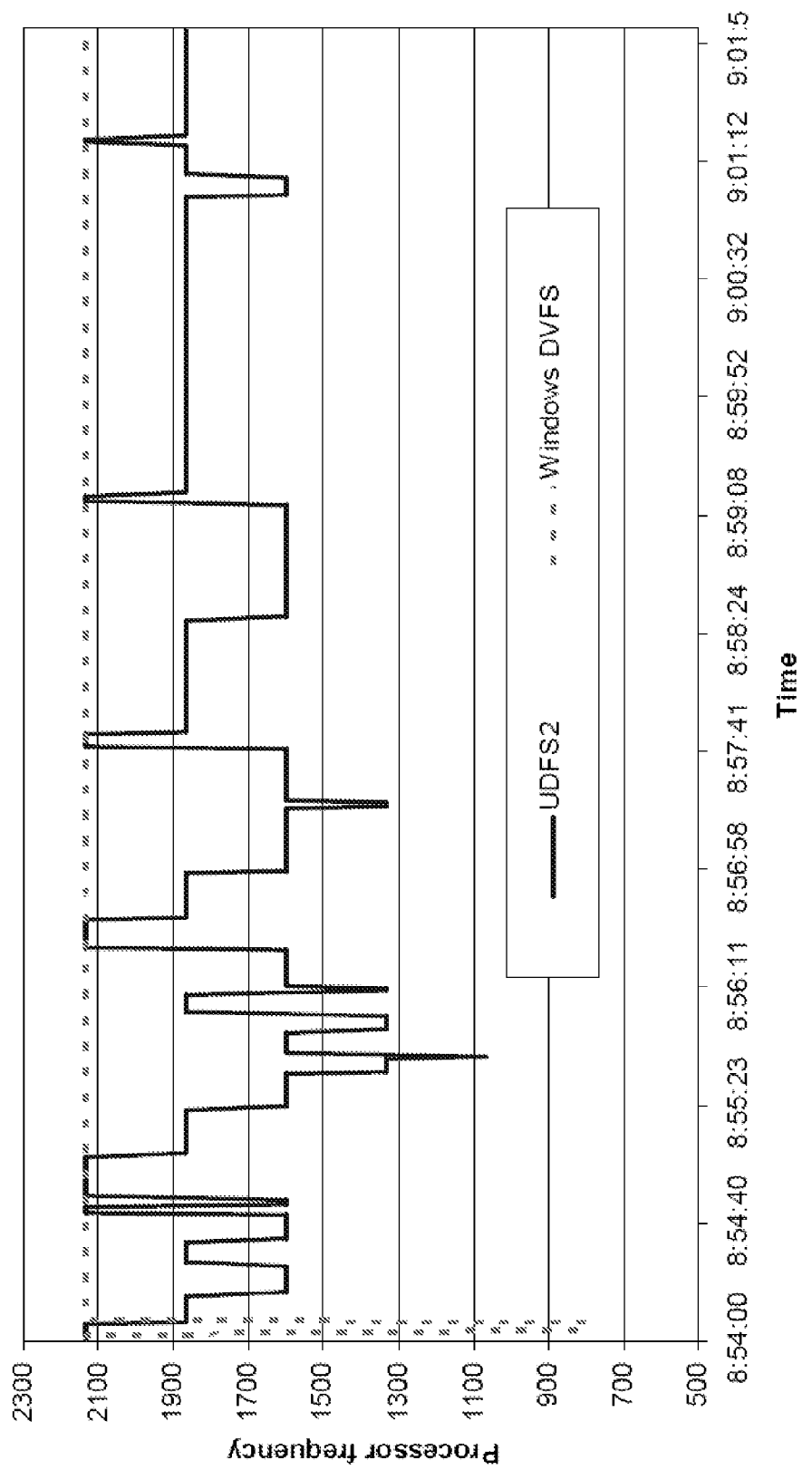
FIG. 3 illustrates a graph comparing the operating frequencies determined by UDFS2 and Windows DVFS according to an embodiment of the present invention.

FIG. 3 illustrates a graph comparing the operating frequencies determined by UDFS2 and Windows DVFS according to an embodiment of the present invention. More particular, FIG. 2 illustrates the operating frequencies determined by the two techniques while a user is playing a game. As in FIG. 2, discussed above, Windows DVFS causes the system to run at the highest operating frequency during the whole execution period except the first few seconds. On the other hand, UDFS2 settles to a frequency of approximately 1.86 GHz, after which little interaction is needed.

In certain embodiments, the operating voltage is determined by the power management component 130 using Process-Driven Voltage Scaling (PDVS). As will be explained in more detail below, PDVS creates a custom profile for a specific processor, such as processor 110, including a mapping from frequency and temperature to the minimum voltage needed for processor stability, taking advantage of process variation. This processor-specific profile is then used online to choose the operating voltage based on the current temperature and operating frequency. The reduction in operating voltage allows for a reduction in power consumption.

Researchers have shown that process variation may cause integrated circuit speed to vary by 30%. Hence, using a single supply voltage setting for a group of processors does not exploit the variation in slack present among the individual processors. PDVS takes advantage of this variation by an offline customization process that determines the slack of the individual processor, as well as its dependence on operating temperature. This offline measurement is used online to dynamically set operating voltage based on frequency and temperature.

The minimum stable voltage of a processor is the supply voltage that guarantees correct execution for a given process variation and environmental conditions. The minimum stable voltage is mainly determined by the critical path delay of a circuit. This delay consists of two components: transistor gate delay and wire delay. Gate delay is inversely related to the operating voltages used in the critical paths of the circuit. Furthermore, temperature affects the delay. In current technologies, carrier mobility in metal-oxide semiconductor (MOS) transistors decreases with increasing temperature. Thus, circuits slow down with increasing temperature. Wire delay is also temperature-dependent and increases under higher current/temperature conditions. The maximum operating frequency ($F_{max}$) varies in direct proportion to the sustained voltage level in the critical timing paths, and inversely with temperature-dependent RC delay. Thus, the necessary processor voltage is also highly dependent on temperature, as is processor lifetime and reliability.

In addition to the operating conditions, which may change dynamically, process variation has an important impact on the minimum voltage sufficient for stable operation. Even in identical environments, a variation in time slack is observed among the manufactured processors of the same family. As a result, each processor reacts differently to changes in operating conditions such as frequency and temperature. For example, although two processors may run safely at 2.8 GHz at the default supply voltage, it is conceivable that their minimum stable voltages will differ. Customizing voltage choices for individual processors adapts to, and exploits, these variations. Despite these known effects of process variation and temperature on minimum stable voltage, current DVFS schemes ignore them: for a given frequency, traditional DVFS schemes use a single voltage level for all the processors within a family at all times. That is, traditional DVFS schemes use the nominal voltage that is specified in the datasheet for the processor family. In addition, traditional DVFS schemes omit the effect of temperature, losing the opportunity to save further power.

The dynamic power consumption of a processor is directly related to frequency and supply voltage and can be expressed using the formula $P = V^2CF$, which states that power is equal to the product of voltage squared, capacitance, and frequency. In addition to its direct impact on the power consumption, reliable operation at increased frequency demands increased supply voltage, thereby having an indirect impact on the power consumption. In general, if the frequency is reduced, a lower voltage is safe.

As processors, such as processor 110, are pushed to higher performance levels and higher transistor densities, thermal management is quickly becoming a first-order design concern. For example, the maximum operating temperature of an Intel Pentium Mobile processor has been specified as 100° C. As a general rule of thumb, the operating temperature of a processor can vary from about 50° C. to about 90° C. during normal operation. Thus, there is a large difference between normal and worst-case temperatures.

The profile for an individual processor 110 may be determined by setting a particular $V_{dd}$ value for one or more operating frequencies supported by the processor. We used [18] to set a. When a new voltage value is set, a stability check is performed. For example, Notebook Hardware Control (NHC) may be used to control the operating voltage and/or frequency. NHC may also be used to run the stability check. To determine the temperature portion of the profile, a program that causes high processor utilization is executed. The high utilization raises the temperature of the processor 110. When the temperature reaches a desired range, a stability check for a particular frequency at a user-defined voltage value is performed.

FIG. 4 illustrates a table showing an exemplary individual profile for a processor according to an embodiment of the present invention. More particularly, FIG. 4 shows the results of determining a minimum stable voltage to be used as an operating voltage for different operating frequencies in different temperature ranges. In addition, for reference, FIG. 4 includes the nominal core voltage given in the datasheet. Note that the nominal voltage is the voltage used by all the DVFS schemes by default. The results reveal that, even at the highest operating temperature, the minimum stable voltage is typically far smaller than the nominal voltage. The results also show that at lower operating frequencies, the effect of temperature on minimum stable voltage is not pronounced. However, temperature change has a significant impact on minimum stable voltage at higher frequencies. For example, at 1.46 GHz, the core voltage value can vary by 5.6% for a temperature change of 30° C. This would reduce dynamic power consumption by 11.4%.

Thus, as the results shown in FIG. 4 illustrate, there is an opportunity for power reduction if we exploit the relationship between frequency, temperature, and the minimum stable voltage. The nominal supply voltage specified in the processor datasheet has a large safety margin over the minimum stable voltages. This is likely due to worst-case assumptions being made unnecessarily at a number of design stages, e.g., about temperature. Conventional DVFS schemes are therefore pessimistic about particular individual CPUs, often choosing higher voltages than are needed to operate safely. They also neglect the effect of temperature, as discussed above, losing the opportunity to save further power.

PDVS uses offline profiling of a processor, such as processor 110, to find the minimum stable voltages for different combinations of temperature and frequency to determine an individual profile for the processor. The offline profiling may be similar to the profiling discussed above, for example. Online temperature and frequency monitoring is then used to set the voltage according to the individual profile.

In certain embodiments, the offline profiling is performed only once. In certain embodiments, the offline profiling is performed periodically. For example, the offline profiling may be performed once every six months. In certain embodiments, the offline profiling is be performed as part of system startup and/or power-on.

One technique to perform the offline profiling to determine the individual profile for the processor according to certain embodiments of the present invention utilizes a watchdog timer-driven script on a modified Knoppix Live CD that writes the profile to a USB flash drive. In this scheme, the temperature is read from online sensors in the processor. The offline profiling script may request confirmation from the user prior to running the utility. Once confirmed, the utility mounts the USB data file "voltlogger.log" and scans the file to determine the last frequency tested, if any. The utility then unmounts the USB file system and begins execution. The utility gets the default frequency and voltage operating points, and systematically lowers the voltage by 16 mV per iteration for each frequency remaining. Each time the voltage is lowered, the CPU is tested with a few million addition operations to verify the system's integrity. If the CPU maintains integrity, the USB file system is mounted to /usb and the voltage/frequency pair is written to the USB drive file "voltlogger.log." To protect the USB data, after each write, the USB filesystem is unmounted again. The cycle then repeats and the voltage is lowered further by 16 mV.

By setting the voltage based on the processor temperature, frequency, and individual profile, PDVS adapts to the operating environment. While the frequency may be readily determined (or controlled), temperature changes dynamically. Hence, in certain embodiments, PDVS has built-in filtering and headroom to account for this fact. For example, PDVS may behave conservatively and set the voltage such that even if there is a change of 5° C. in temperature before the next reading (e.g., a one Hertz rate), the processor will continue working correctly.

In certain embodiments, PDVS determines a safety margin for the operating voltage for the individual processor. The safety margin for the operating voltage is sufficient to assure reliable operation of the processor. The safety margin is determined as part of the offline generation of the individual profile for the processor 110.

In certain embodiments, the power management component 130 determines both an operating frequency and an operating voltage for the processor 110. In certain embodiments, the power management component 130 determines the operating frequency using UDFS and the operating voltage using traditional DVFS techniques. In certain embodiments, the power management component 130 determines the operating frequency using traditional DVFS techniques and the operating voltage using PDVS.

In certain embodiments, the power management component 130 determines both an operating frequency using UDFS and an operating voltage using PDVS for the processor 110. The combination of UDFS and PDVS may provide synergistic power savings. The UDFS algorithms may allow for dramatically decreased average operating frequency and the benefits of PDVS increase as the operating frequency is lowered. At higher frequencies, the relative change from the nominal voltage to the minimum stable voltage is lower than that at lower frequencies. In other words, the power gain from shifting to the minimum stable voltage is higher at the lower frequencies. However, at higher frequencies, PDVS also gains from the variation in minimum stable voltage based on temperature. These two different advantages of the PDVS result in power improvements at a wide range of frequencies.

The processor control component 120 is adapted to configure the processor 110. In particular, the processor control component 120 is adapted to configure a frequency and/or a voltage for the processor 110 to operate. For example, the Windows API may be used by the processor control component 120 to configure the operating frequency and/or voltage of the processor 110. As another example, the processor control component 120 may utilize a model-specific register (MSR) of a processor such as an Intel processor to configure the operating frequency and/or voltage.

The components, elements, and/or functionality of system 100 may be implemented alone or in combination in various forms in hardware, firmware, and/or as a set of instructions in software, for example. Certain embodiments may be provided as a set of instructions residing on a computer-readable medium, such as a memory or hard disk, for execution on a general purpose computer or other processing device.

Figure 5:
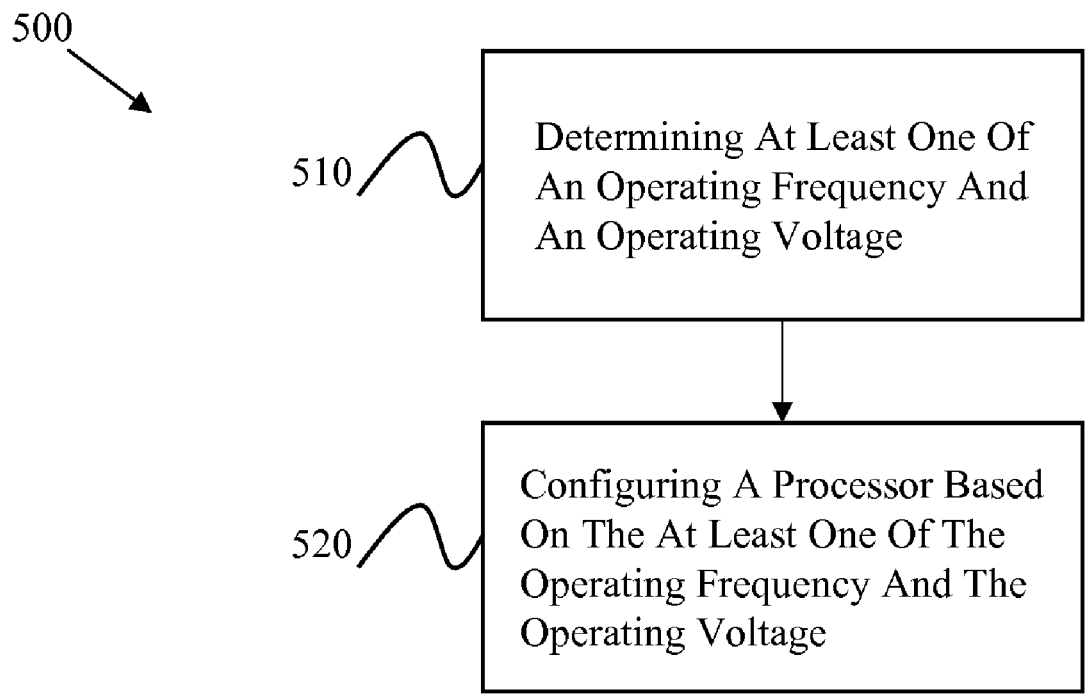
FIG. 5 illustrates a flow diagram for a method for power management according to an embodiment of the present invention.

FIG. 5 illustrates a flow diagram for a method 500 for power management according to an embodiment of the present invention. The method 500 includes the following steps, which will be described below in more detail. At step 510, at least one of an operating frequency and an operating voltage is determined. At step 520, a processor is configured based on the at least one of the operating frequency and the operating voltage. The method 500 is described with reference to elements of systems described above, but it should be understood that other implementations are possible.

At step 510, at least one of an operating frequency and an operating voltage is determined. The at least one of an operating frequency and an operating voltage may be determined by a power management component. The power management component may be similar to the power management component 130, described above, for example.

The operating frequency and/or the operating voltage may be determined using DVFS techniques, for example. In certain embodiments, traditional DVFS techniques are used to determine the operating frequency. In certain embodiments, traditional DVFS techniques are used to determine the operating voltage.

In certain embodiments, the operating frequency is determined using UDFS, as described above. For example, the operating frequency may be determined using the UDFS1 algorithm, described above. As another example, the operating frequency may be determined using the UDFS2 algorithm, described above. In certain embodiments, the operating voltage is determined using PDVS, as described above.

In certain embodiments, both an operating frequency and an operating voltage are determined. In certain embodiments, the operating frequency is determined using UDFS and the operating voltage is determined using traditional DVFS techniques. In certain embodiments, the operating frequency is determined using traditional DVFS techniques and the operating voltage is determined using PDVS.

In certain embodiments, an operating frequency is determined using UDFS and an operating voltage is determined using PDVS. The combination of UDFS and PDVS may provide synergistic power savings. The UDFS algorithms may allow for dramatically decreased average operating frequency and the benefits of PDVS increase as the operating frequency is lowered. At higher frequencies, the relative change from the nominal voltage to the minimum stable voltage is lower than that at lower frequencies. In other words, the power gain from shifting to the minimum stable voltage is higher at the lower frequencies. However, at higher frequencies, PDVS also gains from the variation in minimum stable voltage based on temperature. These two different advantages of the PDVS result in power improvements at a wide range of frequencies.

At step 520, a processor is configured based on the at least one of the operating frequency and the operating voltage. The processor may be similar to the processor 110, described above, for example. The operating frequency may be the operating frequency determined at step 510, described above, for example. The operating voltage may be the operating voltage determined at step 510, described above, for example.

In certain embodiments, the processor is configured by a processor control component. The processor control component may be similar to the processor control component 120, described above, for example. The processor control component is adapted to configure a frequency and/or a voltage for the processor to operate. For example, the Windows API may be used by the processor control component 120 to configure the operating frequency and/or voltage of the processor 110.

One or more of the steps of the method 500 may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

Certain embodiments of the present invention provide power management through determining an operating frequency and/or an operating voltage. Certain embodiments determine an operating frequency using UDFS. Certain embodiments determine an operating frequency using PDVS. Certain embodiments of the present invention provide a technical effect of power management through determining an operating frequency and/or an operating voltage. Certain embodiments provide a technical effect of determining an operating frequency using UDFS. Certain embodiments provide a technical effect of determining an operating frequency using PDVS.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for power management, the method comprising:
   determining an operating frequency and an operating voltage for a processor, wherein the operating frequency is determined based, at least in part, on direct user input, the direct user input being based, at least in part, on real-time individual user satisfaction, wherein the operating voltage is determined based, at least in part, on an individual profile for processor and the determined operating frequency; and
   configuring the processor based on the determined operating frequency and the determined operating voltage, wherein the determined operating voltage is set so that the processor continues to work correctly even if a temperature of the processor changes up to a predetermined threshold before a subsequent periodic reading of operating conditions.

2. The method of claim 1, wherein the individual profile for the processor is determined based on offline profiling of the processor.

3. The method of claim 2, wherein the offline profiling of the processor is performed as part of a system startup.

4. The method of claim 1, wherein the individual profile for the processor includes a safety margin.

5. The method of claim 1, wherein the individual profile for the processor is determined periodically.

6. The method of claim 1, wherein the individual profile includes a mapping of an input temperature range and an input frequency to a minimum output voltage.

7. The method of claim 6, wherein the operating voltage is determined based on the output voltage.

8. The method of claim 6, wherein the input frequency is based on the determined operating frequency.

9. The method of claim 6, wherein the input temperature range is determined based on the temperature of the processor.

10. The method of claim 9, wherein the temperature of the processor is determined by an online sensor in the processor.

11. The method of claim 6, wherein the minimum output voltage is mainly determined by a critical path delay.

12. A processor power management system, comprising:
   a power manager adapted to determine an operating frequency and an operating voltage for a processor, wherein the operating frequency is determined based, at least in part, on direct user input, the direct user input being based, at least in part, on real-time individual user satisfaction, wherein the operating voltage is determined based, at least in part, on an individual profile for processor and the determined operating frequency; and
   a processor controller adapted to configure the processor based on the determined operating frequency and the determined operating voltage, wherein the determined operating voltage is set so that the processor continues to work correctly even if a temperature of the processor changes up to a predetermined threshold before a subsequent periodic reading of operating conditions.

13. The system of claim 12, wherein the individual profile for the processor is determined based on offline profiling of the processor.

14. The system of claim 12, wherein the individual profile for the processor includes a safety margin.

15. The method of claim 14, wherein the safety margin is determined as part of an offline generation of the individual profile for the processor.

16. A computer-readable medium including a set of instructions for execution on a computer, the set of instructions comprising:
   a power management routine configured to determine an operating frequency and an operating voltage for a processor, wherein the operating frequency is determined based, at least in part, on direct user input, the direct user input being based, at least in part, on real-time individual user satisfaction, wherein the operating voltage is determined based, at least in part, on an individual profile for processor and the determined operating frequency; and
   a processor control routine configured to configure the processor based on the determined operating frequency and the determined operating voltage, wherein the determined operating voltage is set so that the processor continues to work correctly even if a temperature of the processor changes up to a predetermined threshold before a subsequent periodic reading of operating conditions.

17. A method for power management, the method comprising:
   determining an operating frequency and an operating voltage for a processor, wherein the operating frequency is determined based, at least in part, on direct user input, the direct user input being based, at least in part, on real-time individual user satisfaction, wherein the operating voltage is determined based, at least in part, on an individual profile for processor; and
   configuring the processor based on the determined operating frequency and the determined operating voltage,
   wherein, if the operating voltage for the processor is lowered, the processor is tested with at least a million arithmetic operations to verify system integrity.

18. The method of claim 17, wherein the operating voltage is determined based, at least in part, on the individual profile and the determined operating frequency, and wherein the determined operating voltage is set so that the processor continues to work correctly even if a temperature of the processor changes up to a predetermined threshold before a subsequent periodic reading of operating conditions.

19. A method for power management, the method comprising:
   determining an operating frequency and an operating voltage for a processor, wherein the operating frequency is determined based, at least in part, on direct user input, the direct user input being based, at least in part, on real-time individual user satisfaction, wherein the operating voltage is determined based, at least in part, on an individual profile for processor, wherein the individual profile for the processor is determined based on an offline profiling of the processor, wherein the offline profiling of the processor is performed using a watchdog timer-driven script; and
   configuring the processor based on the determined operating frequency and the determined operating voltage.

* * * * *